US012676729B2

(12) United States Patent
Hakola et al.

(10) Patent No.: US 12,676,729 B2
(45) Date of Patent: Jul. 7, 2026

(54) SYNCHRONIZATION SIGNAL BLOCK TRANSMISSION

(71) Applicant: Nokia Technologies Oy, Espoo (FI)

(72) Inventors: Sami-Jukka Hakola, Oulu (FI); Jorma Johannes Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 340 days.

(21) Appl. No.: 18/553,087

(22) PCT Filed: Apr. 1, 2021

(86) PCT No.: PCT/EP2021/058638
§ 371 (c)(1),
(2) Date: Sep. 28, 2023

(87) PCT Pub. No.: WO2022/207111
PCT Pub. Date: Oct. 6, 2022

(65) Prior Publication Data
US 2024/0195602 A1      Jun. 13, 2024

(51) Int. Cl.
*H04L 7/04*        (2006.01)
*H04L 5/00*        (2006.01)
*H04W 72/0446*     (2023.01)

(52) U.S. Cl.
CPC .............. *H04L 7/048* (2013.01); *H04L 5/005* (2013.01); *H04W 72/0446* (2013.01)

(58) Field of Classification Search
CPC ....... H04L 7/048; H04L 5/005; H04L 1/1887;
H04L 1/08; H04L 1/189; H04L 5/0007;
H04L 5/0051; H04L 5/0078; H04L
5/0094; H04L 5/0048; H04W 72/0446
See application file for complete search history.

(56) References Cited

U.S. PATENT DOCUMENTS

| | | | | |
|---|---|---|---|---|
| 2020/0053781 A1* | 2/2020 | Pan | ........................ | H04W 72/30 |
| 2020/0413356 A1* | 12/2020 | Wang | ................... | H04W 72/046 |
| 2021/0297966 A1* | 9/2021 | Noh | ........................ | H04L 5/0048 |
| 2022/0150800 A1* | 5/2022 | Harada | ................. | H04L 5/0053 |

* cited by examiner

*Primary Examiner* — Chirag G Shah
*Assistant Examiner* — Joshua Smith
(74) *Attorney, Agent, or Firm* — Carter, DeLuca & Farrell LLP

(57) ABSTRACT

Systems, methods, apparatuses, and computer program products for facilitating robustness for synchronization signal block (SSB) are provided. A network node may attempt to transmit SSBs in first positions. For example, the network node may perform a listen-before-talk (LBT) procedure prior to transmitting the SSBs, and transmissions of the SSBs may fail or succeed based on failure or success of the LBT procedure. If the transmissions fail, the network node may attempt to transmit the failed SSBs in second SSB positions. For example, the second SSB positions may be associated with the first positions, and may be reserved for retransmission of SSBs that fail in the corresponding first positions. If the network node transmits the SSBs, the UE may perform various operations described herein including, e.g., determining whether the SSBs were transmitted in the first positions or the second positions and/or an SSB index or timing.

1 Claim, 8 Drawing Sheets

300

First Positions 202: ☐

Second Positions 204:

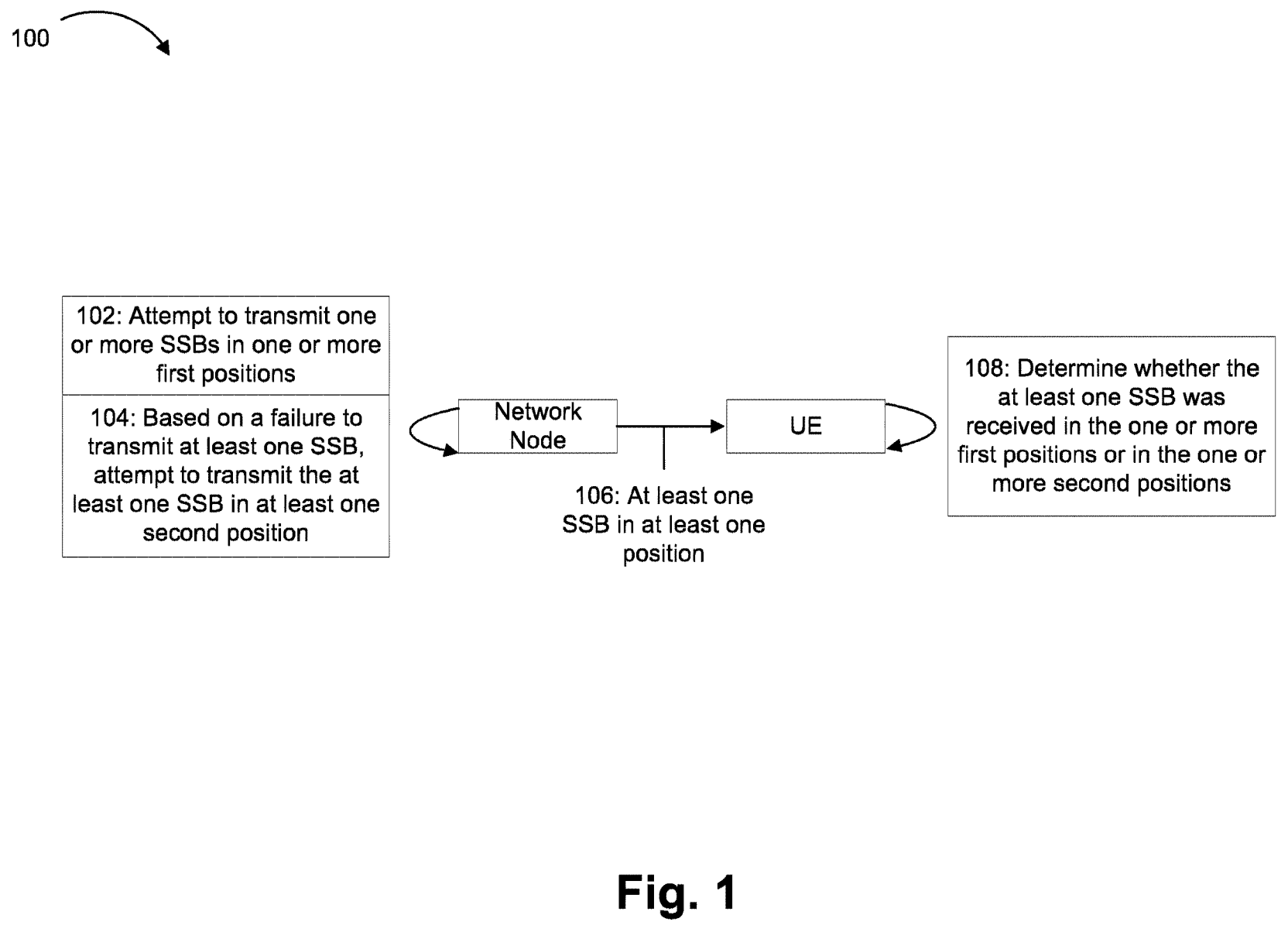

100

Network Node

UE

106: At least one SSB in at least one position

102: Attempt to transmit one or more SSBs in one or more first positions

104: Based on a failure to transmit at least one SSB, attempt to transmit the at least one SSB in at least one second position 108: Determine whether the at least one SSB was received in the one or more first positions or in the one or more second positions

Fig. 1

Attempt to transmit one or more synchronization signal blocks in one or more first positions Attempt to transmit at least one of the one or more synchronization signal blocks in at least one of the one or more second positions based on a failure to transmit the at least one of the one or more synchronization signal blocks

602

604

600

702 — Initiate receiving one or more synchronization signal blocks in one or more positions 704 — Determine whether the one or more synchronization signal blocks were received in the one or more first positions or the one or more second positions

700

SYNCHRONIZATION SIGNAL BLOCK TRANSMISSION

RELATED APPLICATION

This application claims priority to PCT Application No. PCT/EP2021/058638, filed Apr. 1, 2021, and entitled "SYN-CHRONIZATION SIGNAL BLOCK TRANSMISSION," which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for facilitating robustness for synchronization signal block (SSB) transmissions.

BACKGROUND

Examples of mobile or wireless telecommunication sys-tems may include the Universal Mobile Telecommunica-tions System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IOT). With IOT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus to attempt to transmit one or more synchronization signal blocks in one or more first positions. The one or more first positions may be associated with one or more second positions for retrans-mission of the one or more synchronization signal blocks. The at least one memory and the computer program code may be configured to, with the at least one processor, cause the apparatus to, based on a failure to transmit at least one of the one or more synchronization signal blocks, attempt to transmit the at least one of the one or more synchronization signal blocks in at least one of the one or more second positions. The at least one of the one or more second positions may be associated with at least one of the one or more first positions in which the transmission of the at least one of the one or more synchronization signal blocks was previously attempted.

In a variant, the one or more second positions may occur after the one or more first positions in time. In a variant, subsets of the one or more second positions may occur between subsets of the one or more first positions. In a variant, the one or more first positions may include multiple subsets of the one or more first positions, and the one or more second positions may be associated with different subsets of the multiple subsets of the one or more first positions. In a variant, the one or more first positions may include multiple subsets of the one or more first positions, and the one or more second positions may include multiple subsets of the one or more second positions associated with different subsets of the multiple subsets of the one or more first positions. In a variant, the at least one of the one or more synchronization signal blocks may include an indication of whether the at least one of the one or more synchronization signal blocks is transmitted in the at least one of the one or more second positions. In a variant, the at least one memory and the computer program code may be configured to, with the at least one processor, further cause the apparatus to attempt to transmit the at least one of the one or more synchronization signal blocks using at least one of the one or more first positions as the at least one of the one or more second positions. In a variant, the at least one memory and the computer program code may be configured to, with the at least one processor, further cause the apparatus at least to, prior to attempting to transmit the at least one of the one or more synchronization signal blocks in the one or more first positions, determine an association between the one or more first positions and the one or more second positions.

According to a second embodiment, an apparatus may include at least one processor and at least one memory including computer program code. The at least one memory and the computer program code may be configured to, with the at least one processor, cause the apparatus at least to initiate receiving one or more synchronization signal blocks in one or more positions. The one or more positions may include one or more first positions associated with an initial transmission attempt of the one or more synchronization signal blocks, and include one or more second positions, associated with the one or more first positions, for retrans-mission of the one or more synchronization signal blocks. The at least one memory and the computer program code may be configured to, with the at least one processor, cause the apparatus at least to determine whether the one or more synchronization signal blocks were received in the one or more first positions or the one or more second positions.

In a variant, the one or more second positions may occur after the one or more first positions in time. In a variant, subsets of the one or more second positions may occur between subsets of the one or more first positions. In a variant, the one or more first positions may include multiple subsets of the one or more first positions, and the one or more second positions may be associated with different subsets of the multiple subsets of the one or more first positions. In a variant, the one or more first positions may include multiple subsets of the one or more first positions, and the one or more second positions may include multiple subsets of the one or more second positions associated with different subsets of the multiple subsets of the one or more first positions. In a variant, the at least one memory and the computer program code may be configured to, with the at least one processor, further cause the apparatus, when determining whether the one or more synchronization signal blocks were received in the one or more first positions or the one or more second positions, to determine whether the one or more synchronization signal blocks were received in the one or more first positions or the one or more second positions based on an indication in the one or more synchronization signal blocks. In a variant, the at least one memory and the computer program code may be configured to, with the at least one processor, further cause the apparatus, when determining whether the one or more synchronization signal blocks were received in the one or more first positions or the one or more second positions, to determine that the one or more synchronization signal blocks were received in the one or more second positions, where a subset of the one or more first positions was used as the one or more second positions.

In a variant, the at least one memory and the computer program code may be configured to, with the at least one processor, further cause the apparatus to monitor the one or more second positions for the one or more synchronization signal blocks based on failing to detect the one or more synchronization signal blocks in the one or more first positions. In a variant, the at least one memory and the computer program code may be configured to, with the at least one processor, further cause the apparatus at least to determine an index or a slot timing based on determining that the one or more synchronization signal blocks were received in the one or more second positions. In a variant, the at least one memory and the computer program code may be configured to, with the at least one processor, further cause the apparatus, when determining the index or the slot timing, to determine the index or the slot timing based on a physical broadcast channel demodulation reference signal and one or more bits associated with a physical broadcast channel physical layer. In a variant, the at least one memory and the computer program code may be configured to, with the at least one processor, further cause the apparatus, when determining the index or the slot timing, at least to determine the index or the slot timing based on a common subcarrier spacing field of a master information block.

According to a third embodiment, a method may include attempting to transmit one or more synchronization signal blocks in one or more first positions. The one or more first positions may be associated with one or more second positions for retransmission of the one or more synchronization signal blocks. The method may include, based on a failure to transmit at least one of the one or more synchronization signal blocks, attempting to transmit the at least one of the one or more synchronization signal blocks in at least one of the one or more second positions. The at least one of the one or more second positions may be associated with at least one of the one or more first positions in which the transmission of the at least one of the one or more synchronization signal blocks was previously attempted.

In a variant, the one or more second positions may occur after the one or more first positions in time. In a variant, subsets of the one or more second positions may occur between subsets of the one or more first positions. In a variant, the one or more first positions may include multiple subsets of the one or more first positions, and the one or more second positions may be associated with different subsets of the multiple subsets of the one or more first positions. In a variant, the one or more first positions may include multiple subsets of the one or more first positions, and the one or more second positions may include multiple subsets of the one or more second positions associated with different subsets of the multiple subsets of the one or more first positions. In a variant, the at least one of the one or more synchronization signal blocks may include an indication of whether the at least one of the one or more synchronization signal blocks is transmitted in the at least one of the one or more second positions. In a variant, the method may include attempting to transmit the at least one of the one or more synchronization signal blocks using at least one of the one or more first positions as the at least one of the one or more second positions. In a variant, the method may include, prior to attempting to transmit the at least one of the one or more synchronization signal blocks in the one or more first positions, determining an association between the one or more first positions and the one or more second positions.

According to a fourth embodiment, a method may include initiating receiving one or more synchronization signal blocks in one or more positions. The one or more positions may include one or more first positions associated with an initial transmission attempt of the one or more synchronization signal blocks, and may include one or more second positions, associated with the one or more first positions, for retransmission of the one or more synchronization signal blocks. The method may include determining whether the one or more synchronization signal blocks were received in the one or more first positions or the one or more second positions.

In a variant, the one or more second positions may occur after the one or more first positions in time. In a variant, subsets of the one or more second positions may occur between subsets of the one or more first positions. In a variant, the one or more first positions may include multiple subsets of the one or more first positions, and the one or more second positions may be associated with different subsets of the multiple subsets of the one or more first positions. In a variant, the one or more first positions may include multiple subsets of the one or more first positions, and the one or more second positions may include multiple subsets of the one or more second positions associated with different subsets of the multiple subsets of the one or more first positions. In a variant, the determining of whether the one or more synchronization signal blocks were received in the one or more first positions or the one or more second positions, may include determining whether the one or more synchronization signal blocks were received in the one or more first positions or the one or more second positions based on an indication in the one or more synchronization signal blocks. In a variant, the determining of whether the one or more synchronization signal blocks were received in the one or more first positions or the one or more second positions may include determining that the one or more synchronization signal blocks were received in the one or more second positions, where a subset of the one or more first positions was used as the one or more second positions.

In a variant, the method may include monitoring the one or more second positions for the one or more synchronization signal blocks based on failing to detect the one or more synchronization signal blocks in the one or more first positions. In a variant, method may include determining an index or a slot timing based on determining that the one or more synchronization signal blocks were received in the one or more second positions. In a variant, the determining of the index or the slot timing may include determining the index or the slot timing based on a physical broadcast channel demodulation reference signal and one or more bits associated with a physical broadcast channel physical layer. In a variant, the determining of the index or the slot timing may include determining the index or the slot timing based on a common subcarrier spacing field of a master information block.

A fifth embodiment may be directed to an apparatus that may include circuitry configured to cause the apparatus to perform the method according to the third embodiment or the fourth embodiment, or any of the variants of those embodiments discussed above.

A sixth embodiment may be directed to an apparatus that may include means for performing the method according to the third embodiment or the fourth embodiment, or any of the variants of those embodiments discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants of those embodiments discussed above.

An eighth embodiment may be directed to a computer program product encoding instructions for causing an apparatus to perform at least the method according to the third embodiment or the fourth embodiment, or any of the variants of those embodiments discussed above.

BRIEF DESCRIPTION OF THE DRAWINGS

For proper understanding of example embodiments, reference should be made to the accompanying drawings, wherein:

FIG. 1 illustrates an example of facilitating robustness for SSB transmissions, according to some embodiments;

DETAILED DESCRIPTION

Figure 2:
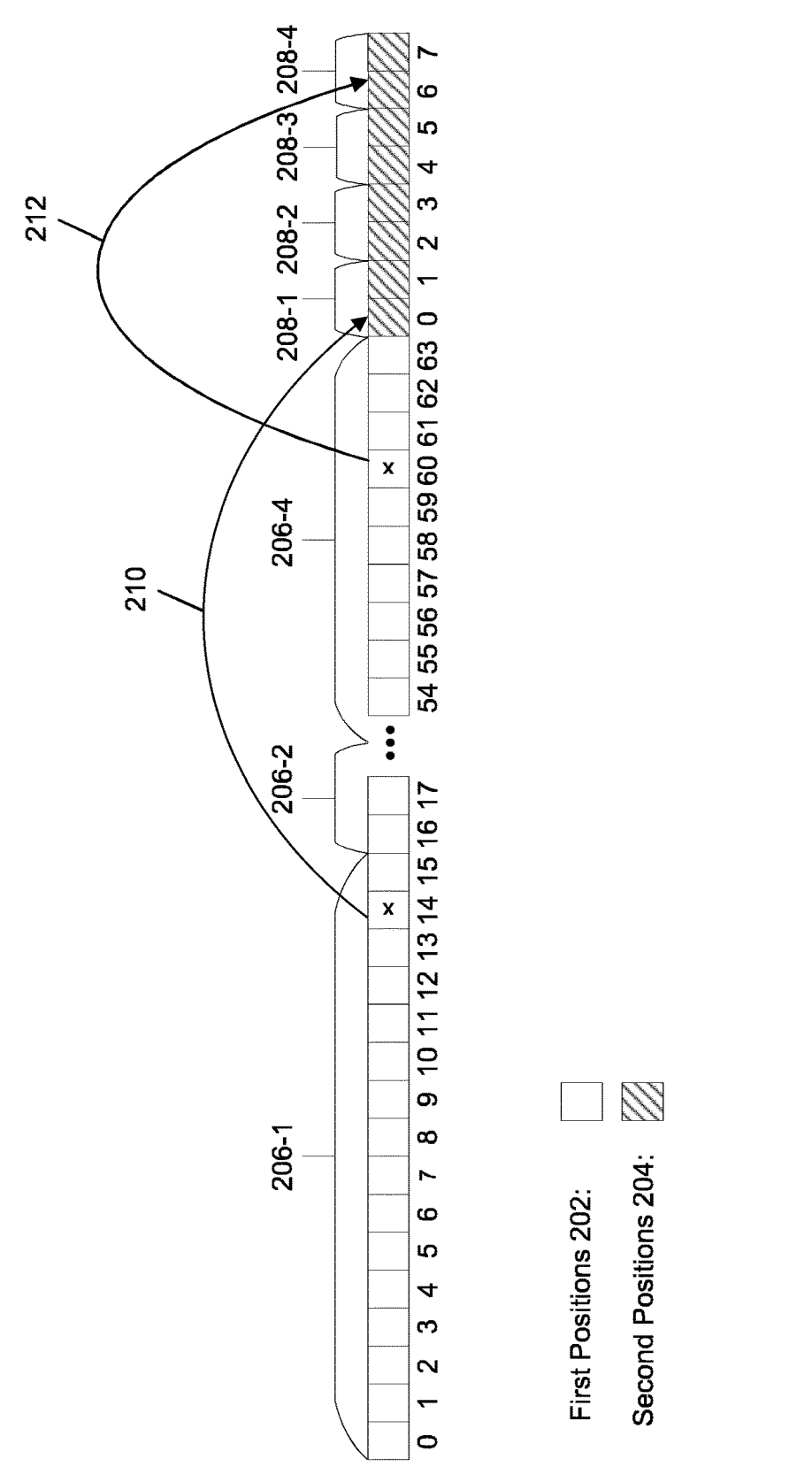
FIG. 2 illustrates an example of grouping first positions that are mapped to second positions, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for facilitating robustness for SSB transmissions is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR may include applications for higher than 52.6 gigahertz (GHz) in unlicensed spectrum, such as 60 GHz unlicensed frequency bands. SSB transmissions and receptions may be performed using these frequencies. Operation on 60 GHz unlicensed spectrum may involve the use of a spectrum sharing or co-channel coexistence mechanism. In some regions, separate operations may be defined for different use cases or deployments, e.g., for fixed outdoor equipment or point-to-point communications or for indoor-only use. One such mechanism is listen-before-talk (LBT). In LBT procedure the transmitter, before being permitted to transmit, may be required to sense that the channel is idle based on an energy detection measurement, referred to as channel sensing.

LBT may be used for transmission of SSBs in certain scenarios. SSBs may be used, e.g., for initial cell search and selection, beam measurements (e.g., beam management), cell measurements (e.g., radio resource management (RRM)), radio link monitoring (RLM), and/or new beam identification in a beam recovery procedure. The block in SSB may include a primary synchronization signal (PSS), secondary synchronization signal (SSS) and physical broadcast channel (PBCH), and demodulation reference signal (DMRS) for PBCH demodulation. In a cell search procedure, the UE may acquire time and frequency synchronization to a cell, and may determine the physical layer cell identifier. The UE may do this by searching for PSS and SSS, and decoding PBCH carried by an SSB. For an SSB index in frequency 2 (FR2) (up to 64 indices), 3 most significant bits (MSBs) may be signalled as part of the physical layer bits in the PBCH, and 3 least significant bits (LSBs) may be signalled in the PBCH DMRS. SSB may sometimes be referred to as Synchronization Signal and PBCH Block.

In NR (and NR-unlicensed (NR-U)) the SSB transmission may be determined so that there is a set of candidate SSB time locations within a half-frame (5 milliseconds (ms)), of which all or a sub-set may be used, depending on the number of broadcast beams assumed in the deployment. The SSBs can be transmitted in certain time positions within a 5 ms half-frame. These locations may be indexed from 0 to $L_{max}-1$ (where $L_{max}$ may represent a maximum number of SSB indexes in a cell; and the maximum number of transmitted SSBs within a half frame may be equal to $L_{max}$), and the index may be carried in SSB, to provide slot level timing information (also symbol and frame timing may be acquired from SSB). In FR2, and also for frequency bands from, e.g., 52.6 GHz to 71 GHz, NR may allow the number of supported SSB beams to be 64.

Discovery burst transmission window (DBTW) may refer to the window during which the SSBs may be transmitted by the cell. NR-U may define a cycling SSB transmission scheme where, for an SSB of a certain index, there may be additional positions that could be used for the transmission of the SSB of the certain index if the LBT failure happened for the first position. There may be various SSB block candidate locations within 10 slots for different index of beams (Q) in use in the cell with 30 kilohertz (kHz) subcarrier spacing (SCS) at below 7 GHz carrier frequency range. The UE can determine the correct SSB index and/or beam index from the formula mod(candidate SSB index, Q), where the candidate SSB index may range from, e.g., 0 to 19 and Q may be either, e.g., 1, 2, 4 or 8 and signalled to the UE in the PBCH. Thus, there may be multiple transmission opportunities per SSB index (SSB beam)—e.g., 2 or 3 opportunities for each beam, even when 8 beams are used for the SSB in the cell.

As discussed above, LBT may be a channel access method that a transmitter uses to sense (measure energy on) the medium or channel before an intended transmission. If the transmitter determines that the medium is vacant, it may start its transmission. If the transmitter determines that the medium is occupied, the transmitter may defer or cancel the transmission. The determining may be based on comparing the measured received energy over the certain time period and over the frequency resources against the defined energy detection threshold (ED). The determining may contain single or multiple measurements referred to as clear channel assessments (CCAs), and there may be multiple variants of LBT. In type 1 LBT, the device may measure the channel to be free for a random number of occasions before accessing the channel. The random number may be uniformly distributed over a range referred to as a contention window. The contention window may be adjusted based on detected channel access collisions between multiple transmissions (e.g., type 1 LBT or category (Cat.) 4 LBT) or the contention window may be of fixed size (e.g., Cat. 3 LBT). In type 2A/B LBT or Cat. 2 LBT, the device may perform a single measurement (single CCA) when determining the channel occupancy.

LBT measurements may be performed at least by the transmitter, but the LBT procedure may also incorporate measurements carried out at the receiver. In other words, the receiver may also monitor the channel access occupancy. At higher carrier frequencies, where narrow beams are typically used, a directional LBT may be used as a channel access method. In this scenario, the transmitter may sense the medium or channel with more narrow beams than with omnidirectional or sector-wide beams. The subsequent transmission may then be expected to take place using the same as, or sub-beam of, the LBT beam.

Duration of DBTW may be no greater than, e.g., 5 ms. With, e.g., 120 kHz SCS, which may be the SCS that is used for the SSBs in certain frequency ranges such as 52.6-71 GHz, transmission of the, e.g., 64 SSB beams takes roughly 4 ms. As a result, within the 5 ms DBTW, there may be only one opportunity to transmit SSBs for each beam. Thus, if LBT fails, transmission of SSB may be greatly delayed. As can be understood from this, there may be a need to facilitate robustness for SSB transmissions, such as in unlicensed spectrum (may also be referred to as unlicensed band or band intended/restricted to operation with shared spectrum channel access). Such unlicensed spectrum may utilize one or more frequency ranges, such as frequencies at higher than 52.6 GHz (e.g., 52.6-71 GHz).

Some embodiments described herein may provide for facilitating robustness for SSB (e.g., in unlicensed spectrum at higher than 52.6 GHz). In certain embodiments, a network node may attempt to transmit SSBs in first positions (e.g., time-frequency resources, such as slots or symbols). For example, the network node may perform a LBT procedure prior to transmitting the SSBs, and transmissions of the SSBs, for example, may fail or succeed based on failure or success of the LBT procedure. If the transmissions fail (e.g., due to failure of the LBT procedure), the network node may attempt to transmit the failed SSBs in second SSB positions. For example, the second SSB positions may be associated with the first positions, and may be reserved for retransmission of SSBs that fail in the corresponding first positions. If the network node transmits the SSBs, the UE may perform various operations described herein including, e.g., determining whether the SSBs were transmitted in the first positions or the second positions and/or an SSB index or timing.

FIG. 1 illustrates an example 100 of facilitating robustness for SSB transmissions, according to some embodiments. As illustrated in FIG. 1, the example 100 includes a network node (e.g., a gNB) and a UE.

Figure 3:
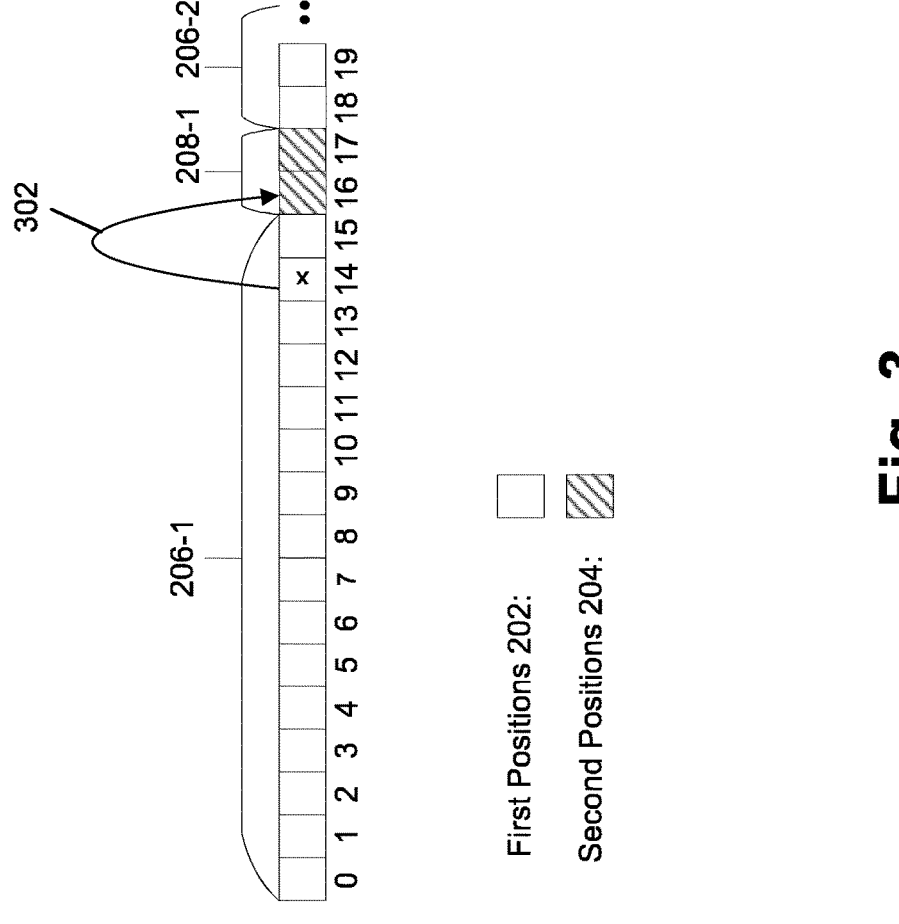
FIG. 3 illustrates another example of grouping first positions that are mapped to second positions, according to some embodiments.
Figure 5:
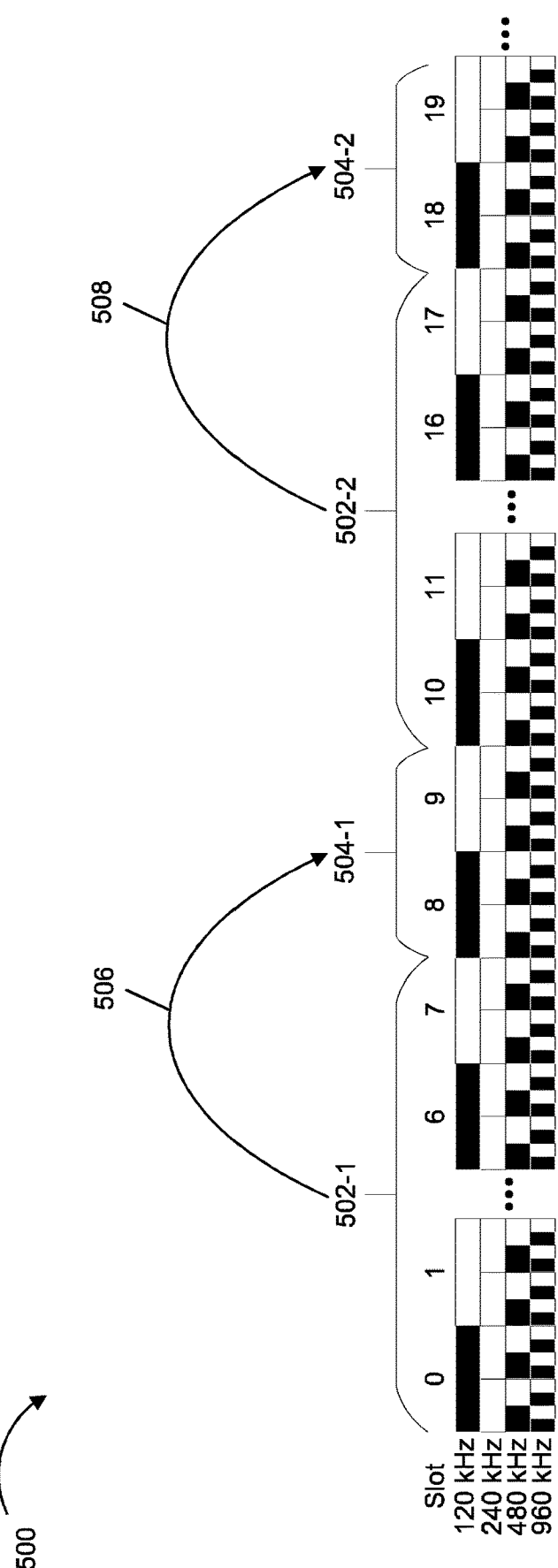
FIG. 5 illustrates an example of a distributed arrangement of second SSB slots, according to some embodiments.

As illustrated at 102 the network node may attempt to transmit one or more SSBs in one or more first positions. For example, the first positions may include time-frequency resources on which the SSBs are scheduled for transmission. Prior to transmitting the SSBs, the network node may perform an LBT procedure. If the LBT procedure indicates that a communications channel is vacant (the LBT procedure is successful), then the network node may transmit the SSBs in the first positions. However, if the LBT procedure indicates that a communications channel is not vacant (the LBT procedure is unsuccessful or fails), then the network node may perform the operations illustrated at 104. Specifically, based on a failure to transmit at least one SSB in the first positions, the network node may attempt to transmit the at least one SSB in at least one second position. The second positions may include additional time-frequency resources that are reserved for retransmission of the SSBs that failed in the first positions. The second positions may be associated with particular first positions (e.g., different second positions may be associated with different first positions, may be associated with a group of first positions, etc.). For example, the network node may determine the second position for an SSB based on the first position in which the network node initially attempted to transmit the SSB. In certain embodiments, the second positions may occur after the first positions in time (as illustrated in FIG. 2), may be distributed between first positions or groups of first positions (as illustrated in FIGS. 3 and 5), and/or the like. In this way, an attempt to transmit an SSB in a certain position (e.g., a first position) may include performing an LBT procedure. If the LBT procedure is unsuccessful or fails, it may be determined that the attempt to transmit the SSB has failed. As such, the SSB is not transmitted due to the LBT procedure being unsuccessful or failing. If the LBT procedure is successful, the SSB may be transmitted. In this case, it may be determined that the attempt to transmit the SSB in the certain position is successful. Although an SSB is transmitted when the LBT procedure is successful, transmitting the SSB does not necessarily mean that the receiver receives the transmitted SSB. According to an embodiment, LBT procedure is performed before transmitting SSB. This may mean that, for example, if there are multiple SSBs to be transmitted, the network node 102 may perform LBT procedure before each SSB transmission attempt. For example, if there are 64 SSBs to transmit, the LBT procedure may be performed before each of said 64 SSB transmission attempts equaling to 64 LBT procedures. The number of performed LBT procedures may increase in cases where at least one of the SSBs needs more than one transmission attempt. That is, LBT procedure may be performed before attempting to transmit an SSB in a first position and in a second position.

As illustrated at 106, the network node may transmit, and the UE may receive, at least one SSB in at least one position. For example, the network node may transmit SSBs in the first positions and/or may transmit SSBs in the second positions.

The UE may perform various operations either in connection with the operations at 102, 104, and 106, or after the operations 102, 104, and 106. For example, the UE may determine a number of second positions n. The UE may be preconfigured with this information, or may determine this information from signalling from the network node or from some other network entity. The UE may determine the number of groups of second positions m, where a group size l of second positions may equal n/m. m, n and/or l may be preconfigured for the UE or signalled to the UE. As illustrated at 108, the UE may determine whether the at least one SSB was received in the one or more first positions or in the one or more second positions. For example, the UE may determine this based on an indication included in the SSB. If the UE determines that the SSB was transmitted in a second position, the UE may determine an SSB index or slot timing of the SSB. As a first example, the UE may calculate the SSB index signalled using PBCH DMRS (e.g., 3 least significant bits (LSBs)) and most significant bits (MSB) (e.g., 3 MSBs) in the PBCH physical layer bits may signal the SSB index when the SSB is transmitted in the second position. The UE may determine the SSB index based on the configuration of the number of second positions or the number of groups of second positions. The UE may determine the value of kSSB bits, which may indicate the position of the SSB in the group. From the SSB index, the UE may determine to which group in the second positions the SSB index belongs and then the UE may determine the slot timing from the kSSB parameter bits that indicate the position within the group of size l (e.g., the position within a group in the additional positions associated with the determined SSB index).

As a second example, the UE may determine, from a repurposed or reinterpreted common subcarrier spacing (subCarrierSpacingCommon) field, the most significant bit for the candidate SSB index of the initial first position in which transmission of the SSB was initially attempted (e.g., the $7^{th}$ bit for the candidate SSB index). This UE may determine the slot timing from this information. These and other aspects of the operations of the network node and/or the UE are described elsewhere herein.

As described above, FIG. 1 is provided as an example. Other examples are possible, according to some embodiments.

FIG. 2 illustrates an example 200 of grouping first positions that are mapped to second positions, according to some embodiments. As further illustrated in FIG. 2, the example 200 includes first positions 202 and second positions 204. In certain embodiments, there may be X first positions 202 (e.g., X=64 in the example 200) and n second positions 204 (where n=8 or n=16, e.g.). Other values of first positions 202 and second positions 204 may be used. The value of X+n may be compatible with a 5 ms window. The first positions 202 may be grouped into groups 206-1 through 206-4 (group 206-2 is partially shown in FIG. 2 and group 206-3 is not shown), and the second positions 204 may be grouped into groups 208-1 through 208-4. For example, n second SSB positions may be further divided into m groups, each group having l=n/m positions. The grouping may facilitate the UE to search limited additional positions for the certain untransmitted or undetected SSB indexes instead of trying to detect SSB from Y second SSB positions that are not associated with particular first positions. For example, the group size could be 2 positions whereas Y might be as large as 16 positions. Because of this, the UE's search for the certain SSBs is limited to 2 positions instead of 16, which reduces search time and conserves computing resources of the UE.

As further illustrated, the groups 208 of second positions 204 may occur after the groups 206 of first positions 202. For example, the n second positions 204 may be allocated after the 64 first positions 202 (as illustrated in FIG. 2) or distributed between bursts of the first positions 202 (e.g., 2 slots with second positions 204 may be allocated after 8 slots having first positions 202).

In the example 200, 16 first positions 202 are mapped to 2 second positions 204. In certain embodiments, second positions 204 can also be allocated after each consecutive burst of first positions 202 (e.g., 16 first positions 202 may form a burst of first positions 202).

As illustrated at 210, an SSB transmission in slot 14 in the group 206-1 of first positions 202 may fail, and retransmission of the failed SSB transmission may be attempted in a second position 204 of the group 208-1. For example, the group 208-1 of second positions 204 may be associated with the group 206-1 of first positions 202, and the second positions 204 of the group 208-1 may be reserved for retransmission of SSBs that the network node failed to transmit in the group 206-1. As illustrated at 212, retransmission of a failed transmission of an SSB in the group 206-4 of first positions 202 may be attempted in the corresponding group 208-4 of second positions 204. In this way, e.g., SSB indices 0, . . . (64/m)−1 can be transmitted in the first l positions where l<=(64/m), SSB indices (64/m), . . . 2×(64/m)−1 can be transmitted in the second set of l positions, and so forth. If more than l SSBs fail (and would need to be transmitted in l second positions 204) in the associated group of SSB indices (e.g., l<(64/m)), the network node may apply additional time multiplexing so that certain determined SSB indices can be transmitted in the additional l locations. For example, SSB indices for which mod(SSBindex, l) 0 can be transmitted in a system frame number (SFN) where mod(SFN,l) 0.

A UE may monitor, in the second positions 204, untransmitted or undetected SSBs (e.g., that failed in the first positions 202). For example, the UE may monitor SSBs with indices 0, . . . , (64/m)−1 in the group 208-1, SSB(s) with indices (64/m), . . . , 2×(64/m)−1 in the group 208-2, etc.

As indicated above, FIG. 2 is provided as an example. Other examples are possible, according to some embodiments.

FIG. 3 illustrates another example 300 of grouping first positions that are mapped to second positions, according to some embodiments. As illustrated in FIG. 3, the example 300 includes first positions 202, second positions 204, groups 206 of first positions 202, and groups 208 of second positions 204. In the example of FIG. 300, the groups 208 of second positions 204 are distributed between the groups 206 of first positions 202, rather than occurring after the groups 206 of first positions 202. As illustrated at 302, retransmission of a failed SSB transmission in the group 206-1 may be attempted in the group 208-1 that is between the group 206-1 and the group 206-2.

As described above, FIG. 3 is provided as an example. Other examples are possible, according to some embodiments.

In certain embodiments, the network node may dynamically use the first positions as second positions. For example, the network node may determine to use certain first positions for retransmission of a previously failed SSB transmission in an earlier first position. Certain operations described herein may be used in connection with those embodiments. For example, the UE may determine an indication of whether or not the detected SSB is an initial transmission of an SSB (e.g., in a first position) or a retransmitted SSB (e.g., in a second position). Additionally, or alternatively, the UE may determine the position of the SSB (e.g., for determining timing). Additionally, or alternatively, the UE may determine the indication of the SSB index that was retransmitted in the second position. There may be a limited number of bits available, e.g., as in kSSB, and there may be a limitation that the retransmission be performed at latest, e.g., 16 positions later than the actual SSB position (e.g., so that, e.g., four bits may be used for the indication). The indication may be a pointer backwards in the positions. For example, if SSB index #4 was not transmitted in its first position, the network node may transmit the SSB in the position #13 and the SSB may indicate that this specific SSB is a retransmission of the SSB index #4 (e.g., four bits may be used to indicate 9 positions backwards).

In certain embodiments, timing information (e.g., SFN) may be used to determine the correct interpretation of the SSB index or slot timing for the additional SSB positions. The SSB index of where the network node initially attempts to transmit an SSB (the first position) may be determined based on an index of the received SSB (the index of the second position) plus mod(SFN,4). When mod(SFN,4) 0, the UE may interpret the SSB index #0 received in the second position to map the SSB index #0, and when mod (SFN,4) 1, the SSB index #0 received in a second position may map to SSB index #1.

Figure 4:
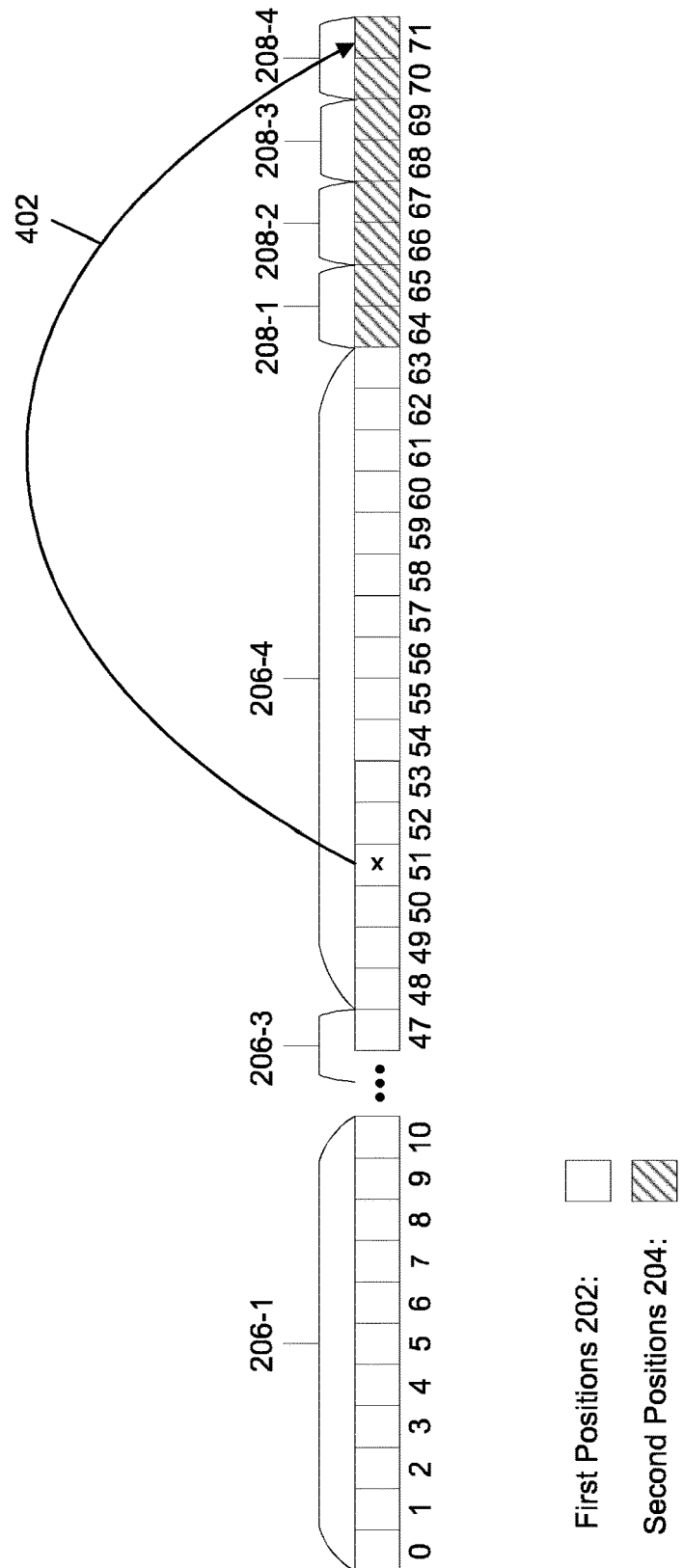
FIG. 4 illustrates an example of determining a slot timing or an SSB index, according to some embodiments.

FIG. 4 illustrates an example 400 of determining a slot timing or an SSB index, according to some embodiments. As illustrated in FIG. 4, the example 400 includes first positions 202, second positions 204, groups 206 of first positions 202, and groups 208 of second positions 204. As illustrated at 402, the network node may determine that an SSB cannot be transmitted, e.g., in SSB index #51, but may determine that the SSB can be transmitted in SSB index #71.

The UE may determine, from a detected SSB, whether or not the SSB is in a first position or a second position. For example, the UE may determine the position (and the slot timing) for the detected SSB. In certain embodiments, one or more bits may be used to signal this information. For example, a common subcarrier spacing (subCarrierSpacing-Common) field of a master information block (MIB) signaled in PBCH payload as part of the SSB can be reused or reinterpreted to indicate the position of the SSB. Indication of whether or not a detected SSB is in a first position 202 or a second position 204 may allow the network node to use a different number of actually transmitted SSBs. In other words, the number of first positions 202 used can be X<=64, in certain embodiments.

If the UE determines that the SSB detected is not in a first position 202 (e.g., from subCarrierSpacingCommon) the UE may determine the actual SSB index and slot timing in various manners. As a first example, an SSB index signalled using PBCH DMRS and MSB bits in the PBCH physical layer bits may signal the SSB index when the SSB is transmitted in a second position 204. In this example, (when an SSB is transmitted in the second position 204) kSSB bits can be repurposed or reinterpreted so that the UE can determine the received SSB position within the group of size 1. From the SSB index, the UE may determine to which group in additional positions the SSB index belongs and then the UE may determine the slot timing from the kSSB bits that indicate the position within the group of additional SSB positions (kSSB can be used to indicate the additional location index). This can be implemented so that the number of additional positions, e.g., 8 or 16, and the size of the group (or number of groups), e.g., 2 or 4, may be preconfigured.

As a second example, the repurposed or reinterpreted subCarrierSpacingCommon field may be used as the MSB for the candidate SSB index (the position of the SSB), e.g., the $7^{th}$ bit for the candidate SSB index. The UE may determine the group index from the detected SSB in the second positions 204. kSSB bits may be used to signal the UE the actual SSB index within a group, e.g., four bits of kSSB can signal one of the 16 SSB indices per group.

As an additional example, the UE may calculate the SSB index signalled using PBCH DMRS. For example, 3 least significant bits (LSBs) and most significant bits (MSB) (e.g., 3 MSBs) in the PBCH physical layer bits may signal the SSB index, where the SSB index may be determined as the SSB is transmitted in the first position. Then the UE may determine, from a repurposed or reinterpreted common subcarrier spacing (subCarrierSpacingCommon) field, that the SSB is transmitted in a second position.

In the example 400, the UE may determine the position of the SSB as position #71 and may determine, from the position, that the SSB index is included in the group 208-4 (positions #48-63). From kSSB, the UE may determine index #51 as the first position in which transmission of the SSB was initially transmitted. For example, the kSSB may signal the value 4 as the index value (based on position #47+4=position #51, where position #47 is the last position in the prior group 206 of first positions 202 (e.g., group 206-3)).

As described above, FIG. 4 is provided as an example. Other examples are possible, according to some embodiments.

FIG. 5 illustrates an example 500 of distributed arrangement of second SSB slots, according to some embodiments. FIG. 5 illustrates slots (e.g., 0, 1, . . . N) for various frequencies. The slots may be grouped into groups 502 of first positions and groups 504 of second positions. The slots for the groups 504 may be distributed between slots for the groups 502.

As illustrated at 506, the network node may attempt an SSB transmission that failed in the group 502-1 in the group 504-1, and, at 508, may similarly attempt an SSB transmission that failed in the group 502-2 in the group 504-2. For example, in the slots #8 and #9 there may be additional SSB positions that can be used to re-transmit the SSB index that were initially attempted in the slots #0-#7. Similarly, the slots #18 and #19 may provide additional SSB positions for the SSBs of which first positions are in the slots #10-#17.

SSBs detected in the second SSB positions may provide the UE the SSB index and an indication that the SSB was transmitted in the second position (e.g., by re-interpreting subCarrierSpacingCommon), and the kSSB bits may provide the additional SSB location within the slots (e.g., there may be four additional positions in the slots #8 and #9 and the kSSB bits may provide values corresponding to one of those slots), so that the UE can determine the slot timing.

As described above, FIG. 5 is provided as an example. Other examples are possible, according to some embodiments.

Figure 6:
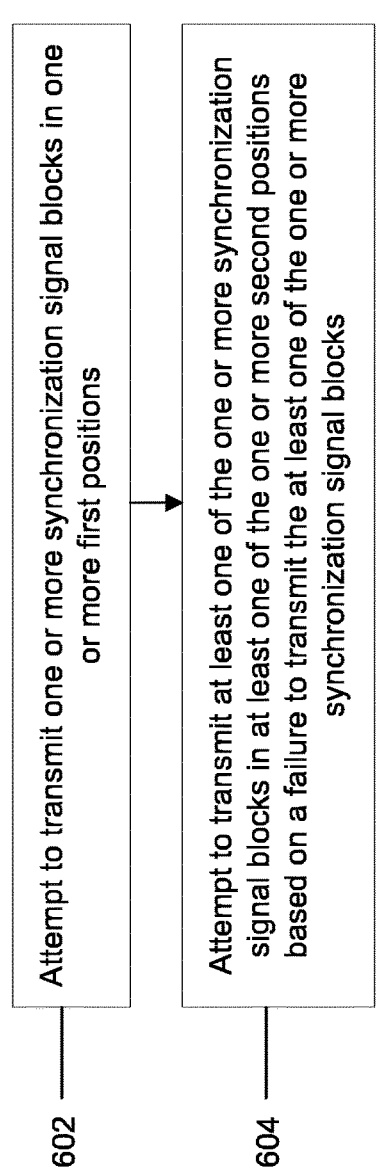
FIG. 6 illustrates an example flow diagram of a method, according to some embodiments.

FIG. 6 illustrates an example flow diagram of a method 600, according to some embodiments. For example, FIG. 6 may illustrate example operations of a network node (e.g., apparatus 10 illustrated in, and described with respect to, FIG. 4*a*). Some of the operations illustrated in FIG. 6 may be similar to some operations shown in, and described with respect to, FIGS. 1-5.

In an embodiment, the method 600 may include, at 602, attempting to transmit one or more synchronization signal blocks in one or more first positions, e.g., in a manner similar to that at 102 of FIG. 1. The one or more first positions may be associated with one or more second positions for retransmission of the one or more synchronization signal blocks. The method 600 may include, at 604, attempting to transmit at least one of the one or more synchronization signal blocks in at least one of the one or more second positions based on a failure to transmit the at least one of the one or more synchronization signal blocks, e.g., in a manner similar to that at 104 of FIG. 1. The at least one of the one or more second positions may be associated with at least one of the one or more first positions in which the transmission of the at least one of the one or more synchronization signal blocks was previously attempted.

The method illustrated in FIG. 6 may include one or more additional aspects described below or elsewhere herein. In some embodiments, the one or more second positions may occur after the one or more first positions in time, e.g., as illustrated in FIG. 2. In some embodiments, subsets of the one or more second positions may occur between subsets of the one or more first positions, e.g., as illustrated in FIGS. 3 and 5. In some embodiments, the one or more first positions may include multiple subsets of the one or more first positions, and the one or more second positions may be associated with different subsets of the multiple subsets of the one or more first positions. In some embodiments, the one or more first positions may include multiple subsets of the one or more first positions, and the one or more second positions may include multiple subsets of the one or more second positions associated with different subsets of the multiple subsets of the one or more first positions, e.g., different groups 208 of second positions 204 may be associated with different groups 206 of first positions 202. In some embodiments, the at least one of the one or more synchronization signal blocks may include an indication of whether the at least one of the one or more synchronization signal blocks is transmitted in the at least one of the one or more second positions. In some embodiments, the attempting at 604 may include attempting to transmit the at least one of the one or more synchronization signal blocks using at least one of the one or more first positions as the at least one of the one or more second positions (e.g., by dynamically using a first position 202 as a second position 204). In some embodiments, the method 600 may include, prior to attempting to transmit the at least one of the one or more synchronization signal blocks in the one or more first positions, determining an association between the one or more first positions and the one or more second positions. In some examples, this may mean that the network node 102 groups the one or more first positions into two or more first subsets and groups the one or more second positions into two or more second subsets, and associates the two or more first subsets with the two or more second subsets. For example, the two or more first subsets may be associated with different second subsets (e.g., one first subset associated with one second subset). These subsets may sometimes be referred to as groups. An example of this grouping and associating may be illustrated, for example, in FIG. 2 in which group 206-1 (i.e., one of the two or more first subsets) is associated with group 208-1 (i.e., one of the two or more second subsets) and group 206-4 (i.e., one of the two or more first subsets) with group 208-4 (i.e., one of the two or more second subsets).

As described above, FIG. 6 is provided as an example. Other examples are possible according to some embodiments.

Figure 7:
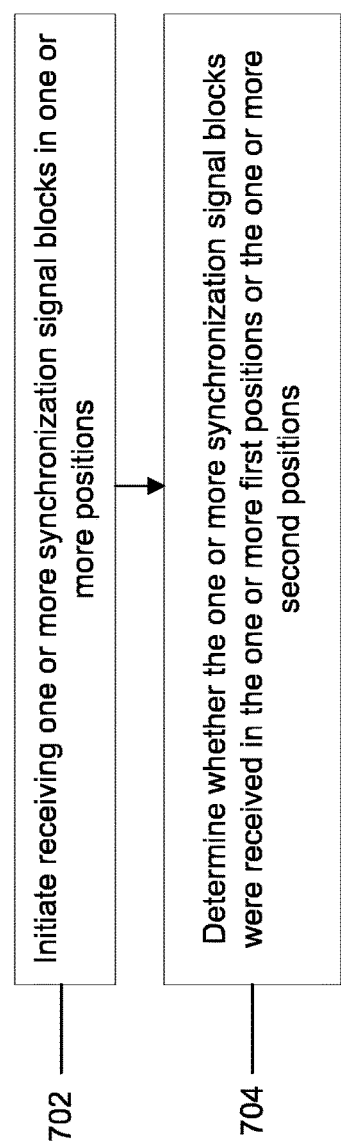
FIG. 7 illustrates an example flow diagram of a method, according to some embodiments.

FIG. 7 illustrates an example flow diagram of a method 700, according to some embodiments. For example, FIG. 7 may illustrate example operations of a UE (e.g., apparatus 20 illustrated in, and described with respect to, FIG. 4*b*). Some of the operations illustrated in FIG. 7 may be similar to some operations shown in, and described with respect to, FIGS. 1-5.

In an embodiment, the method 700 may include, at 702, initiating receiving one or more synchronization signal blocks in one or more positions, e.g., in a manner similar to that at 106 of FIG. 1. The one or more positions may include one or more first positions associated with an initial transmission attempt of the one or more synchronization signal blocks, and may include one or more second positions, associated with the one or more first positions, for retransmission of the one or more synchronization signal blocks. The method 700 may include, at 704, determining whether the one or more synchronization signal blocks were received in the one or more first positions or the one or more second positions, e.g., in a manner similar to that at 108 of FIG. 1.

The method illustrated in FIG. 7 may include one or more additional aspects described below or elsewhere herein. In some embodiments, the one or more second positions may occur after the one or more first positions in time, e.g., as illustrated in FIG. 2. In some embodiments, subsets of the one or more second positions may occur between subsets of the one or more first positions, e.g., as illustrated in FIGS. 3 and 5. In some embodiments, the one or more first positions may include multiple subsets of the one or more first positions, and the one or more second positions may be associated with different subsets of the multiple subsets of the one or more first positions. In some embodiments, the one or more first positions may include multiple subsets of the one or more first positions, and the one or more second positions may include multiple subsets of the one or more second positions associated with different subsets of the multiple subsets of the one or more first positions, e.g., different groups 208 of second positions 204 may be associated with different groups 206 of first positions 202. In some embodiments, the determining at 704 may include determining whether the one or more synchronization signal blocks were received in the one or more first positions or the one or more second positions based on an indication in the one or more synchronization signal blocks.

In some embodiments, the determining at 704 may include determining that the one or more synchronization signal blocks were received in the one or more second positions. In some embodiments, a subset of the one or more first positions may have been used as the one or more second positions (e.g., by dynamically using a first position 202 as a second position 204). In some embodiments, the method 700 may further include monitoring the one or more second positions for the one or more synchronization signal blocks based on failing to detect the one or more synchronization signal blocks in the one or more first positions. In some embodiments, the method 700 may further include determining an index or a slot timing based on determining that the one or more synchronization signal blocks were received in the one or more second positions. In some embodiments, the determining of the index or the slot timing may include determining the index or the slot timing based on a physical broadcast channel demodulation reference signal and one or more bits associated with a physical broadcast channel physical layer. In some embodiments, the determining of the index or the slot timing may include determining the index or the slot timing based on a common subcarrier spacing field of a master information block.

As described above, FIG. 7 is provided as an example. Other examples are possible according to some embodiments.

Figures 8A, 8B:
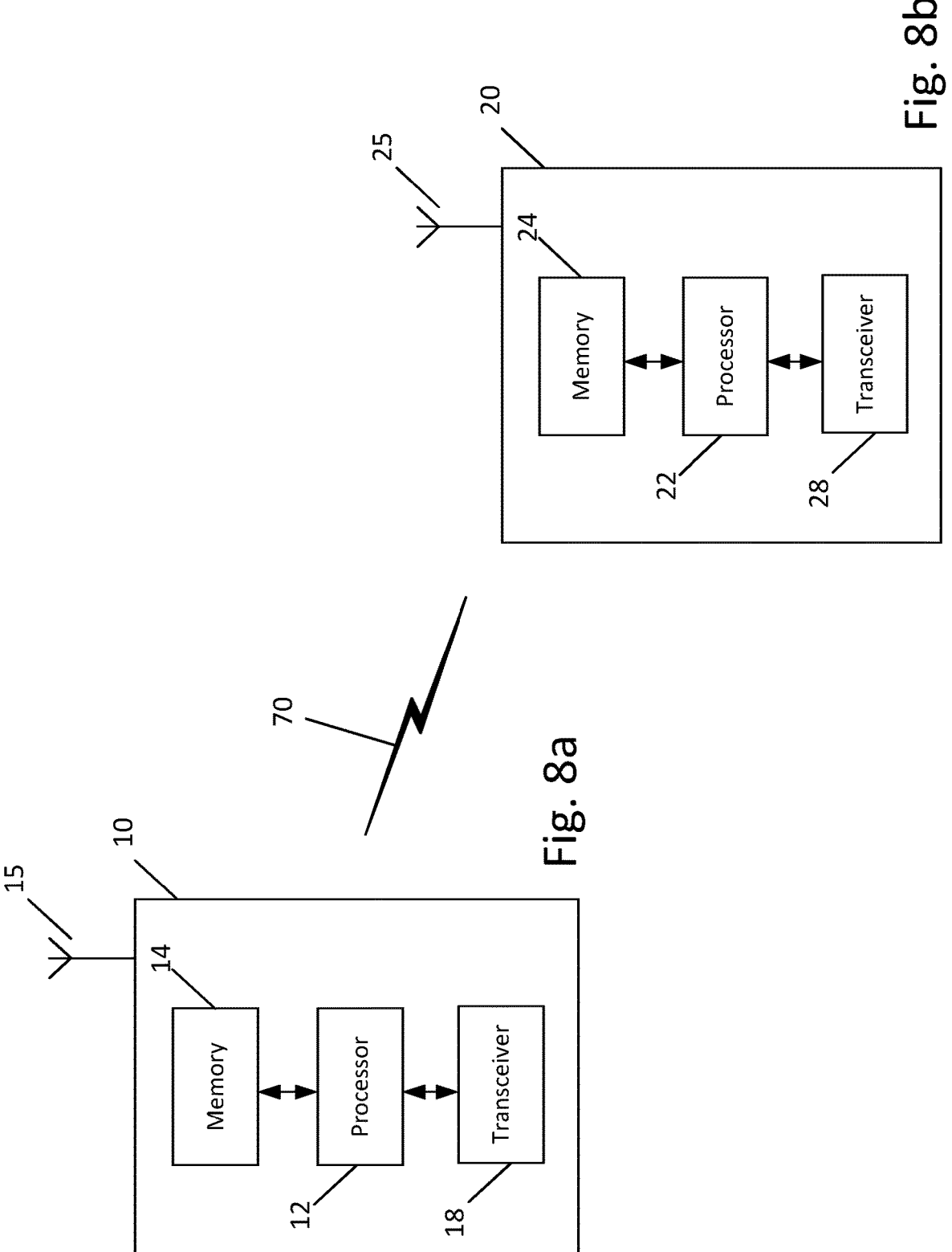
FIG. 8a illustrates an example block diagram of an apparatus, according to an embodiment.
FIG. 8b illustrates an example block diagram of an apparatus, according to another embodiment.

FIG. 8a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-6. For instance, apparatus 10 may be controlled by memory 14 and processor 12 to perform the method of FIG. 6.

FIG. 8b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IOT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IOT device, for example. According to certain embodiments, apparatus 20 may be controlled by memory 24 and processor 22 to perform the functions associated with any of the embodiments described herein, such as some operations illustrated in, or described with respect to, FIGS. 1-5 and 7. For instance, in one embodiment, apparatus 20 may be controlled by memory 24 and processor 22 to perform the method of FIG. 7.

In some embodiments, an apparatus (e.g., apparatus 10 and/or apparatus 20) may include means for performing a method or any of the variants discussed herein, e.g., a method described with reference to FIG. 6 or 7. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is use of additional SSB transmission resources for the SSB retransmissions when, e.g., LBT failure prevents initial SSB transmission within an SSB burst. Accordingly, the use of some example embodiments results in improved functioning of communications networks and their nodes and, therefore constitute an improvement at least to the technological field of SSB transmissions, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

DMRS Demodulation Reference Signal
PBCH Physical Broadcast Channel
PDCCH Physical Downlink Control Channel
SFN System Frame Number
SSB Synchronization Signal Block

We claim:

1. An apparatus, comprising:
at least one processor; and
at least one memory including computer program code,
wherein the at least one memory and the computer program code are configured to, with the at least one processor, cause the apparatus at least to:
initiate receiving synchronization signal blocks in positions,
wherein the positions include first positions associated with an initial transmission attempt of the synchronization signal blocks, and include second positions, respectively associated with the first positions, reserved for retransmission of the one or more synchronization signal blocks that failed to transmit in the first positions,
wherein the first positions comprise multiple subsets of the first positions,
wherein the second positions comprise multiple subsets of the second positions respectively associated with different subsets of the multiple subsets of the first positions, wherein the subsets of the second positions occur between the multiple subsets of the first positions,
wherein the first positions and the second positions are located in a single discovery burst transmission window;
monitor a second subset of the subsets of the second positions for the synchronization signal blocks based on failing to detect the synchronization signal blocks in a respective first subset of the subsets of the first positions, wherein the second subset of the subsets of the second positions to be monitored is respectively associated with the first subset of the subsets of the first positions;
determine whether the synchronization signal blocks were received in the first positions or the second positions based on an indication in the synchronization signal blocks, the indication identifying a first synchronization signal block of the synchronization signal blocks as being transmitted in a first retransmission position in the second subset of the subsets of the second positions;
determine a synchronization signal block index (SSB index) based on determining that the synchronization signal blocks were received in the second positions, the SSB index is determined based on a physical broadcast channel demodulation reference signal and one or more bits associated with a physical broadcast channel physical layer; and
determine a slot timing based on determining that the synchronization signal blocks were received in the second positions, the slot timing is determined based on a common subcarrier spacing field of a master information block.

* * * * *